J. W. & A. E. BOWERS.
TOASTING DEVICE.
APPLICATION FILED AUG. 8, 1917.
1,300,565.
Patented Apr. 15, 1919.
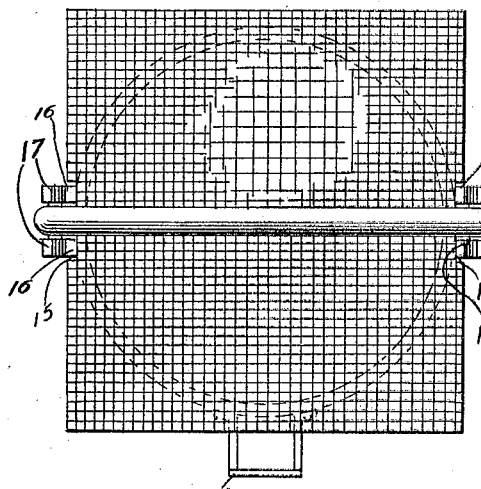
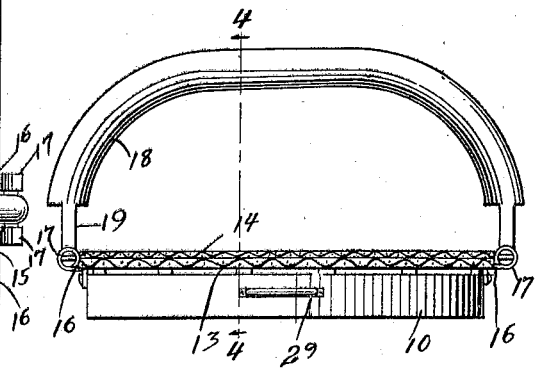
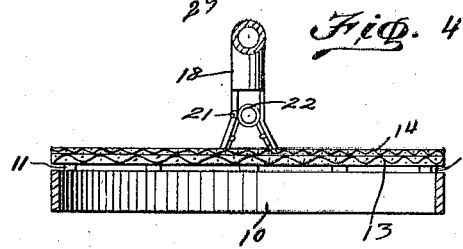
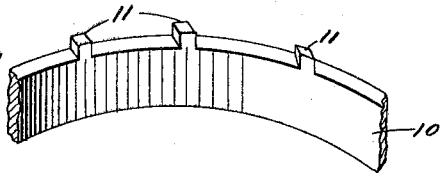
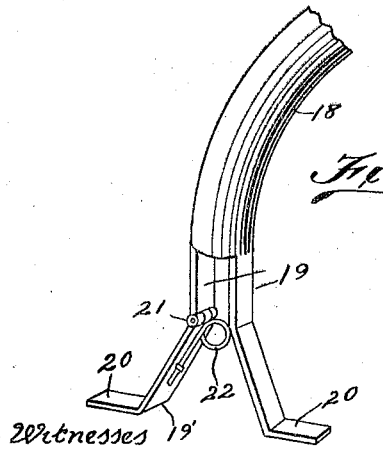
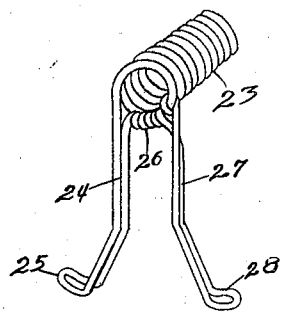
Witnesses
W. Moore
N. M. Test
Inventor
J. W. Bowers
A. E. Bowers
By Chandler & Chandler
Attorneys

UNITED STATES PATENT OFFICE.

JOHN W. BOWERS AND ANNA E. BOWERS, OF QUAKERTOWN, PENNSYLVANIA.

TOASTING DEVICE.

1,300,565.  Specification of Letters Patent.  Patented Apr. 15, 1919.

Application filed August 8, 1917. Serial No. 185,149.

*To all whom it may concern:*

Be it known that we, JOHN W. BOWERS and ANNA E. BOWERS, citizens of the United States, residing at Quakertown, in the county of Bucks, State of Pennsylvania, have invented certain new and useful Improvements in Toasting Devices; and we do hereby declare the following to be a full, clear, and exact description of the invention, such as will enable others skilled in the art to which it appertains to make and use the same.

This invention relates to improvements in toasting devices and particularly to devices for toasting bread or for roasting or baking potatoes.

One object of the present invention is to provide a novel and simple device of this character which can be placed on the top of a cook stove to toast bread and without danger of burning the bread.

Another object is to provide a device of this character which can be easily handled in placing the same on or removing it from the stove.

Another object is to provide a device of this character which is readily adapted to be placed in the oven of the stove for the purpose of baking potatoes or other articles of food.

Other objects and advantages will be apparent from the following description when taken in connection with the accompanying drawing.

In the drawings:

Figure 1 is a top plan view of our improved toasting device.

Fig. 2 is a side elevation of the same.

Fig. 3 is an enlarged perspective view of one end of the detachable handle.

Fig. 4 is an enlarged vertical sectional view taken on the line 4—4 of Fig. 2.

Fig. 5 is an enlarged perspective view of one end of a modified form of detachable handle.

Fig. 6 is a perspective view of a portion of the ring which supports the wire screen.

Referring particularly to the accompanying drawing 10 represents an endless metal ring or band of suitable diameter and height, which forms the base of the toaster. On the upper edge of the band there are formed the upwardly extending lugs 11. Disposed to rest on the upper ends of these lugs is a sheet 13 of wire screen cloth of comparatively coarse mesh. Resting loosely on the screen 13 is a second wire screen cloth of finer mesh, as shown at 14, both of said screens being readily removable when not needed.

On the fine screen the slices of bread are placed to be toasted, while the ring or band 10 is arranged to rest on the top of the stove. The band is of such height that the bread will be toasted without burning.

At opposite sides of both of the screens there are formed the recesses 15 through which project the angle members 16 carried by the band. The outer ends of the angle members are formed with the eyes 17 for the reception of portions of the handle which will now be described.

The handle, as shown in the figures except Fig. 5, is formed from a metal blank and includes the rolled tubular hand grip portion 18, at the ends of which there are disposed the downwardly extending legs 19. The lower ends of these legs are turned outwardly away from each other to form the lugs 20 which are arranged to be engaged in the before-mentioned eyes 17. One of each pair of legs has its lower portion 19' hinged to main portion of the leg at 21, and disposed between this hinged portion of the leg and the other leg, is a coil spring 22 which normally urges the pivoted portions outwardly so as to properly engage the lugs of the legs in the eyes of the band.

The general outline of the screens, as shown in the drawing, is rectangular, but this may be varied as desired.

While the angle members are shown as riveted to the band, it will be understood that other means may be employed to secure said members to the band, and that the exact formation of the angle members may be changed without departing from the spirit of the invention or the scope of the claims.

Referring particularly to Fig. 5, it will be seen that the handle member is formed from a single length of suitable stiff wire. This form includes the coiled hand grip portion 23, the opposite ends of which are extended downwardly to form the leg portions 24, which are bent outwardly to form the lugs 25, the wire being then returned to form the other portion of the lug and other side of the leg. The wire is then coiled about one of the turns of the grip portion as shown at 26, from whence it is extended and bent to form the other leg 27 and lug 28, the terminal of the wire being finally secured around the same helix turn of the grip portion that carries the coil 26. The legs of this form are resilient and can be sprung inwardly toward each other when it is desired to disengage the lugs from the eyes of the angle members, for the removal of the handle.

To release the handle of the first form, it is only necessary to press inwardly on the hinged portion of one of the legs of each pair to release the lug of said portion from the eyes, when the other lugs can be readily slipped from the other eyes.

If desired the upper fine meshed screen may be dispensed with when the device is used in the oven, as when baking potatoes, or other articles of food.

Secured to the band is a handle member 29 which is used for withdrawing the device from the oven, or the same may be used as a means for hanging the toaster on a nail or hook, when the device is not in use.

What is claimed is:

1. A toasting device including a base, a pair of superimposed reticulated article supporting members removably supported on the base and having notches in diametrically opposite sides, eye members carried by the opposite sides of the base for disposition in said notches, to hold the reticulated members against horizontal movement on the top of the base, and a handle member straddling the upper side of the device and having leg portions on its opposite ends and resiliently and detachably engaged in said eye members.

2. A toasting device including a base member, a coarse meshed screen secured on the base member, a fine meshed screen secured to the base member and disposed above the first screen, said screens having oppositely arranged notches, angle members carried by diametrically opposite sides of the base and provided with eyes in their outer ends, and a handle member including a hand grip portion having legs formed on the ends thereof, said legs being disposed through the notches of the screens and formed with lugs for engagement in said eyes, one leg at each end of the handle member being provided with a spring pressed portion whereby the said lugs are capable of detachment from the eyes.

In testimony whereof, we affix our signatures in the presence of two witnesses.

JOHN W. BOWERS.
ANNA E. BOWERS.

Witnesses:
E. CLINTON FRETZ,
RUTH V. WILMOTH.

Copies of this patent may be obtained for five cents each, by addressing the "Commissioner of Patents, Washington, D. C."